(12) United States Patent
Eriksson et al.

(10) Patent No.: US 10,071,443 B2
(45) Date of Patent: Sep. 11, 2018

(54) LASER SINTERING TECHNIQUE FOR MANUFACTURING ITEMS ON A MOVABLE SINTERING PLATFORM

(71) Applicant: Siemens Aktiengesellschaft, Munich (DE)

(72) Inventors: Jonas Eriksson, Finspong (SE); Ulf Simmons, Norrkoping (SE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 14/420,262

(22) PCT Filed: Aug. 2, 2013

(86) PCT No.: PCT/EP2013/066272
§ 371 (c)(1),
(2) Date: Feb. 6, 2015

(87) PCT Pub. No.: WO2014/023657
PCT Pub. Date: Feb. 13, 2014

(65) Prior Publication Data
US 2015/0217405 A1 Aug. 6, 2015

(30) Foreign Application Priority Data
Aug. 9, 2012 (EP) .................................. 12179803

(51) Int. Cl.
*B23K 26/34* (2014.01)
*B33Y 30/00* (2015.01)
(Continued)

(52) U.S. Cl.
CPC ........ *B23K 26/342* (2015.10); *B29C 67/0077* (2013.01); *B29C 67/0085* (2013.01); *B33Y 10/00* (2014.12); *B33Y 30/00* (2014.12)

(58) Field of Classification Search
CPC ............ B29C 67/0077; B29C 67/0085; B23K 26/342; B23K 26/345; B23K 26/03; B33Y 30/00; B33Y 10/004
(Continued)

(56) References Cited

U.S. PATENT DOCUMENTS 6,066,285 A 5/2000 Kumar
6,144,008 A * 11/2000 Rabinovich ............. B22F 3/005
156/180
(Continued)

FOREIGN PATENT DOCUMENTS

CN 1678448 A 10/2005
CN 101896309 A 11/2010
(Continued)

*Primary Examiner* — Dana Ross
*Assistant Examiner* — Kuangyue Chen
(74) *Attorney, Agent, or Firm* — Beusse Wolter Sanks & Maire

(57) ABSTRACT

A laser sintering device and a laser sintering method are provided. The laser sintering device includes a laser source and a sintering platform. The laser source projects a laser beam on a plane, and by changing directions of the laser beam an action area on the plane is defined. The sintering platform provides a sintering area. The sintering platform is arranged in such a way that at least a first region of the sintering area is located within the action area and at least a second region of the sintering area is located outside the action area. The sintering platform is movable such that at least a part of the second region replaces at least a part of the first region within the action area.

11 Claims, 6 Drawing Sheets

(51) Int. Cl.
*B33Y 10/00* (2015.01)
*B23K 26/342* (2014.01)
*B29C 67/00* (2017.01)

(58) Field of Classification Search
USPC .................................. 219/121.64, 121.63
See application file for complete search history.

(56) References Cited

U.S. PATENT DOCUMENTS

| | | |
|---|---|---|
| 6,482,576 B1 | 11/2002 | Duesman et al. |
| 6,694,207 B2 * | 2/2004 | Darrah ................ B29C 67/0077 |
| | | 219/121.64 |
| 6,713,125 B1 * | 3/2004 | Sherwood ........... B29C 71/0009 |
| | | 427/157 |
| 2006/0108712 A1 | 5/2006 | Mattes |
| 2010/0266438 A1 | 10/2010 | Gensert |

FOREIGN PATENT DOCUMENTS

| | | |
|---|---|---|
| EP | 1640110 A1 | 3/2009 |
| JP | 2008149326 A | 7/2008 |

* cited by examiner

LASER SINTERING TECHNIQUE FOR MANUFACTURING ITEMS ON A MOVABLE SINTERING PLATFORM

CROSS REFERENCE TO RELATED APPLICATIONS

This application is the US National Stage of International Application No. PCT/EP2013/066272 filed Aug. 2, 2013, and claims the benefit thereof. The International application claims the benefit of European Application No. EP12179803 filed Aug. 9, 2012. All of the applications are incorporated by reference herein in their entirety.

FIELD OF INVENTION

The present technique relates to a device and a method for laser sintering for manufacturing items and more particularly for manufacturing items on a movable sintering platform.

BACKGROUND OF INVENTION

Laser Melting, also referred to as laser sintering, is a well known method of manufacturing items from powder material, also called feedstock. The conventionally known laser sintering device has a sintering platform on which the item is built layer by layer by providing successive layers of feedstock wherein each layer is molten at selective regions of the layer by a laser beam.

The item to be manufactured is represented as a three dimensional computer model (hereinafter 3D model) for example a CAD (computer aided design) model. The 3D model is present as a series of sections divided in parallel planes disposed one upon the other. Each section contains information about a segment of the item to be manufactured.

In the conventional technique, on a surface of the sintering platform, a first layer of feedstock with a predetermined thickness, e.g. 20 to 40 micrometer is applied. Subsequently, a laser beam from a laser source scans over the surface of the first layer such that the feedstock melts and fuses together in selective regions of the first layer, i.e. where one wants to build the segment of the item. The regions where laser melting is performed are required to be located within an action area of the laser beam, i.e. where the laser beam can perform acceptable sintering by accurately and adequately melting the feedstock. Herein, the spatial extension of the action area is limited due to a limited scanning range of the laser beam. Thus, a first built segment corresponding to one section of the 3D model is obtained.

The sintering platform is then moved downwards and a second layer of the feedstock is applied. The surface of the second layer is located within the action area of the laser beam. The laser beam scans over the surface of the second layer to form a second built segment corresponding to a second section of the 3D model. Moreover, the scanning laser beam also results in fusing of the first build segment with the second built segment.

The method is similarly repeated for other successive sections of the 3D model. Thus, the laser sintering device forms the segments layer by layer of the feedstock. The surface of each successive layer of feedstock is located in the action area of the laser beam. In this way the entire geometry of the item is built up from the formation of successive built segments.

However, the conventional laser sintering as described above is useful for building an item with dimensions such that the surface of the item to be manufactured can be accommodated within the action area of the laser beam. For example, in conventionally known laser sintering techniques, the action area is approximately 250 by 250 mm square on surface of the feedstock layer applied. Thus, the sintering surface is limited heavily by action area of the laser beam. This drawback results from the laser beam deflection and is well known in the art of laser sintering. Attempting to sinter an object with a larger surface area on the feedstock layer results in degradation of the laser beam quality and the outcome is an inferior quality of item.

SUMMARY OF INVENTION

Thus, an object of the present invention is to provide a laser sintering technique wherein the sintering area is not limited by the action area of the laser beam. Thus, items with larger surface area can easily be manufactured by the laser sintering technique.

This object is achieved by a device and a method of the independent claims. Advantageous developments emerge from the dependent claims.

The present invention provides a laser sintering device that includes a laser source and a sintering platform. The laser source projects a laser beam on a plane, and further performs a change in direction of the laser beam such as to define an action area on the plane.

The 'action area' as used herein for the present invention may be defined as an area on the plane such that the laser source is capable of projecting the laser beam at any arbitrary place within the action area so that a feedstock at that arbitrary place may be adequately and precisely melted so as to be fused to obtain a substantially accurate desired geometry.

The sintering platform provides a sintering area by supporting a layer of feedstock on at least a part of the sintering platform. The sintering platform is arranged in such a way that at least a first region of the sintering area is located within the action area and at least a second region of the sintering area is located outside the action area. The sintering platform is movable such that at least a part of the second region replaces at least a part of the first region within the action area i.e. during or after movement of the sintering platform at least a part of the second region replaces at least a part of the first region within the action area. Thus, the sintering area is not limited by the action area of the laser beam, and items with larger surface area can easily be manufactured by the present technique.

In one embodiment, the laser sintering device includes a rotation module to move the sintering platform in a rotary motion about a horizontal axis substantially parallel to the plane and/or in a rotary motion about a vertical axis substantially perpendicular to the plane. Thus, by simply rotating the sintering platform the part of the second region replaces the part of the first region within the action area. Such rotary motions require simple mechanism and thus, the laser sintering device has a simplified construction.

In another embodiment, the laser sintering device includes a translation module to effect a translational motion of the sintering platform along a translational axis substantially parallel to the plane. Thus, by simply translating the sintering platform the part of the second region replaces the part of the first region within the action area. Such translational motions require simple mechanism and thus, the laser sintering device has a simplified construction.

In another embodiment, the laser sintering device includes a retraction module to effect a retraction motion of the sintering platform along a retraction axis substantially perpendicular to the plane. Thus, as a result of the retraction motion, successive layers of the feedstock are accommodated on the sintering platform and yet maintaining at least a part of the sintering area within the action area.

In another embodiment, the laser sintering device includes a controller to control the rotary motion about the horizontal axis and/or the rotary motion about the vertical axis and/or the translational motion along the translational axis and/or the retraction motion along the retraction axis. Thus, any of the movements of the sintering platform is controllable by the controller and a need for manual intervention for the movements of the sintering platform is obviated. Moreover, the movements may be accurately and precisely controlled.

In another embodiment of the laser sintering device, the sintering platform comprises a means for attachment of a workpiece with the sintering platform. Thus, the technique is applicable for creating parts on the workpiece by sintering. The workpiece may be an article that is manufactured before and requires additional parts to be sintered on it. The workpiece may be manufactured by any conventional manufacturing technique such as casting. Thus, the technique of the invention is usable for manufacturing methods when the item is finally produced by a combination of the workpiece produced by a conventional manufacturing method and parts created onto the workpiece by laser sintering. Alternatively, the workpiece may be manufactured by a separate laser sintering operation.

In another embodiment of the laser sintering device, the workpiece is attached such that at least a first part of the workpiece extends into the first region of the sintering area and at least a second part of the workpiece extends into the second region of the sintering area. Thus, the technique may be used for performing laser sintering on multiple parts of the workpiece without a need to realign the workpiece after sintering has been performed on one part of the workpiece and before sintering is performed on other part of the workpiece.

In another embodiment, the laser sintering device includes a feedstock supply module. The feedstock supply module applies the feedstock onto the sintering platform or onto a pre-existing layer of the feedstock. Thus, a continuous operation of the laser sintering device may be carried out obviating a need to halt operations for externally applying layers of feedstock.

In another embodiment of the laser sintering device, the first region and the second region are non-coplanar and substantially parallel to each other. Thus, the sintering platform may be a three dimensional body having at least two opposing surfaces that are non-coplanar and substantially parallel to each other. On one such surface, facing the laser beam, a layer of feedstock may be applied and sintering may be performed. Subsequently, the sintering platform may be moved such that the other surface faces the laser beam, a layer of feedstock may be applied on the surface and sintering may be performed. Thus, a workpiece may be fixed in the sintering platform, and a first sintering operation may be carried out at one end of the workpiece and then a second sintering operation at the other end of the workpiece without requiring realignment of the workpiece onto the sintering platform between the two sintering operations.

In another embodiment of the laser sintering device, the first region and the second region are substantially coplanar. Thus, the sintering platform contains a surface with an area greater than the action area. Thus, an item with large surface area may be manufactured. Moreover, a workpiece may be fixed in the sintering platform, and a first sintering operation may be carried out at one end of the workpiece and a second sintering operation may be carried out at the other end of the workpiece in a continuous manner without requiring to manufacture the item in parts and then join the parts to obtain the complete item.

The invention also discloses a laser sintering method using a laser sintering device comprising a laser source adapted to project a laser beam on a plane, and further adapted to change a direction of the laser beam such as to define an action area in the plane. In the method, the action area is defined in the plane by changing the direction of the laser beam. A feedstock is applied on a sintering platform and a sintering area is provided by supporting a layer of the feedstock on at least a part of the sintering platform. The sintering platform is arranged such that at least a first region of the sintering area is located within the action area and at least a second region of the sintering area is located outside the action area. The laser beam is projected on the action area when the first region is located within the action area. The sintering platform is moved such that at least a part of the second region replaces at least a part of the first region within the action area. Finally, the laser beam is projected on the action area when the part of the second region is located within the action area.

In one embodiment of the laser sintering method, moving the sintering platform includes rotating the sintering platform about a horizontal axis substantially parallel to the plane and/or rotating the sintering platform about a vertical axis substantially perpendicular to the plane and/or effecting a translational motion of the sintering platform along a translational axis substantially parallel to the plane. Thus, by simply rotating the sintering platform and/or by effecting the translational motion, the part of the second region replaces the part of the first region within the action area. Thus, the laser sintering method is simple and easy to perform.

In another embodiment of the laser sintering method, applying the feedstock on the sintering platform includes attaching a workpiece with the sintering platform, and providing a covering layer of feedstock around at least a part of the workpiece such that the sintering area is provided by at least apart of the covering layer. Thus, the laser sintering method may be used for performing sintering on the workpiece.

BRIEF DESCRIPTION OF THE DRAWINGS

The present technique is further described hereinafter with reference to illustrated embodiments shown in the accompanying drawings, in which.

DETAILED DESCRIPTION OF INVENTION

Figure 1:
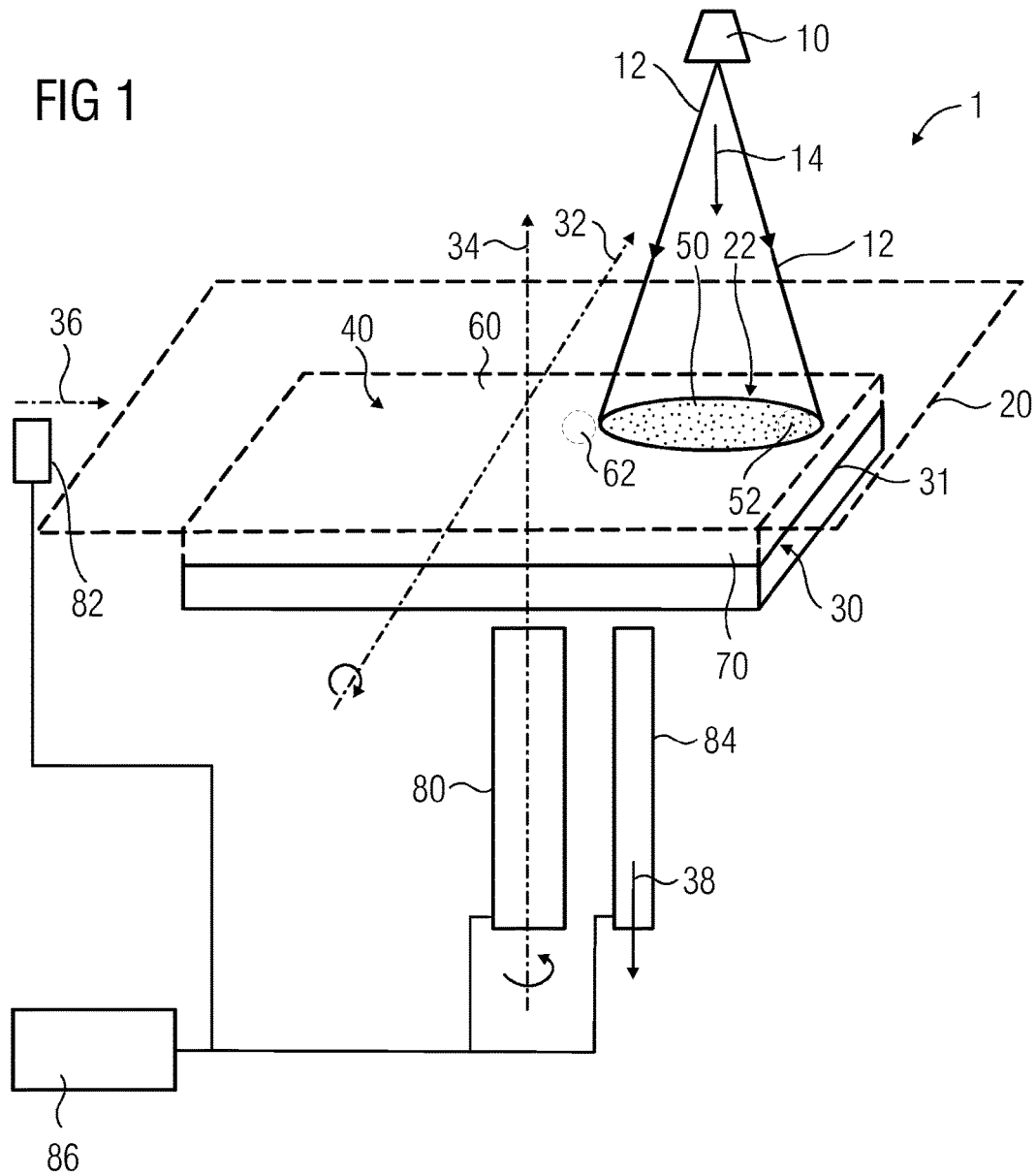
FIG. 1 is a schematic drawing of an exemplary embodiment of a laser sintering device with a movable sintering platform, according to the invention.

Hereinafter, the best mode for carrying out the present technique is described in details. Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Referring now to the figures, FIG. 1 schematically represents an exemplary embodiment of a laser sintering device 1 for manufacturing an item, according to the invention. The laser sintering device 1 includes a laser source 10 and a sintering platform 30. The laser source 10 projects a laser beam 12 on a plane 20. Furthermore, the laser source 10 is capable of changing a direction 14 of the laser beam 12 as projected on the plane 20. By the change in direction 14 of the laser beam 12 an action area 22 on the plane 20 is defined.

The laser source 10 may comprise of a laser generator (not shown) and a scanner (not shown). The laser beam 12 may be produced by the laser generator and projected onto the plane 20 in the direction 14 by the scanner. The scanner is capable of changing the direction 14 of the laser beam 12. The laser source 10 is well known in the art of laser sintering and thus, same has not been described herein for sake of brevity.

The sintering platform 30 is a three dimensional structure suitable for supporting a layer 70 of the feedstock. The sintering platform 30 also supports the item that is manufactured by the laser sintering device 1 during a sintering operation and/or at the end of the sintering operation.

The sintering platform 30 provides a sintering area 40 by supporting the layer 70 of feedstock on at least a part 31 of the sintering platform 30. The sintering area 40 is the area which is provided by a surface of the feedstock when the feedstock is supported on the sintering platform 30.

In an initial orientation of the laser sintering device 1, the sintering platform 30 is arranged in such a way that at least a first region 50 of the sintering area 40 is located within the action area 22 and at least a second region 60 of the sintering area 40 is located outside the action area 22. In the initial orientation, the sintering operation may be carried out on the layer 70 of the feedstock located in the first region 50 of the sintering area 40.

However, unlike the conventional laser sintering machines, the initial orientation of the laser sintering device 1 may be changed into a later orientation of the laser sintering device 1. The sintering platform 30 of the laser sintering device 1 of the invention is movable such that at least a part 52 of the first region 50 is replaceable by at least a part 62 of the second region 60 within the action area 22 resulting into the later orientation of the laser sintering device 1. Thus, by moving the sintering platform 30, the part 62 which was earlier outside the action area 22 is brought into the action area 22. In the later orientation, the sintering operation may be carried out on the layer 70 of the feedstock located in the part 62 of the second region 60 which was brought into the action area 22 as a result of the movement of the sintering platform 30. It may be noted that region 60 was located outside the action area 22 when the device 1 was in initial orientation.

Thus, by carrying out the sintering operations when the device 1 is in the initial orientation and subsequently when the device 1 is in later orientation, an article or an item may be manufactured which has a surface area greater than the action area 22 of the laser beam 12. It may be noted that the multiple sintering operations may be carried out in an intermittent manner or in a continuous manner wherein the movement of the sintering platform 30 is synchronized with the sintering operation.

Furthermore, it may also be noted that, by adequately moving the sintering platform 30, the first region 50 of the sintering area 40 may be completely replaced by parts of or by complete area of the second region 60.

The movement of the sintering platform 30 which results in the replacement of the part 52 of the first region 50 of the sintering area 40 by the part 62 of the second region 60 of the sintering area 40 may be performed by different ways.

In one exemplary embodiment, the movement of the sintering platform 30 in the laser sintering device 1 may be performed by effecting a translation motion of the sintering platform 30. The translational motion of the sintering platform 30 is effected by a translation module 82 included in the device 1. The translational motion of the sintering platform 30 is performed along a translational axis 36. Although the translational axis 36 is depicted by an arrow mark 36, it may be noted that the translational axis 36 may be in any direction substantially parallel to the plane 20 and is not limited by the arrow mark 36. The sintering platform 30 may move in the translational motion in a to and from manner along the translational axis 36. An exemplary embodiment of the device 1 depicting the translational motion of the sintering platform 30 is further explained in FIG. 2.

Figure 2:
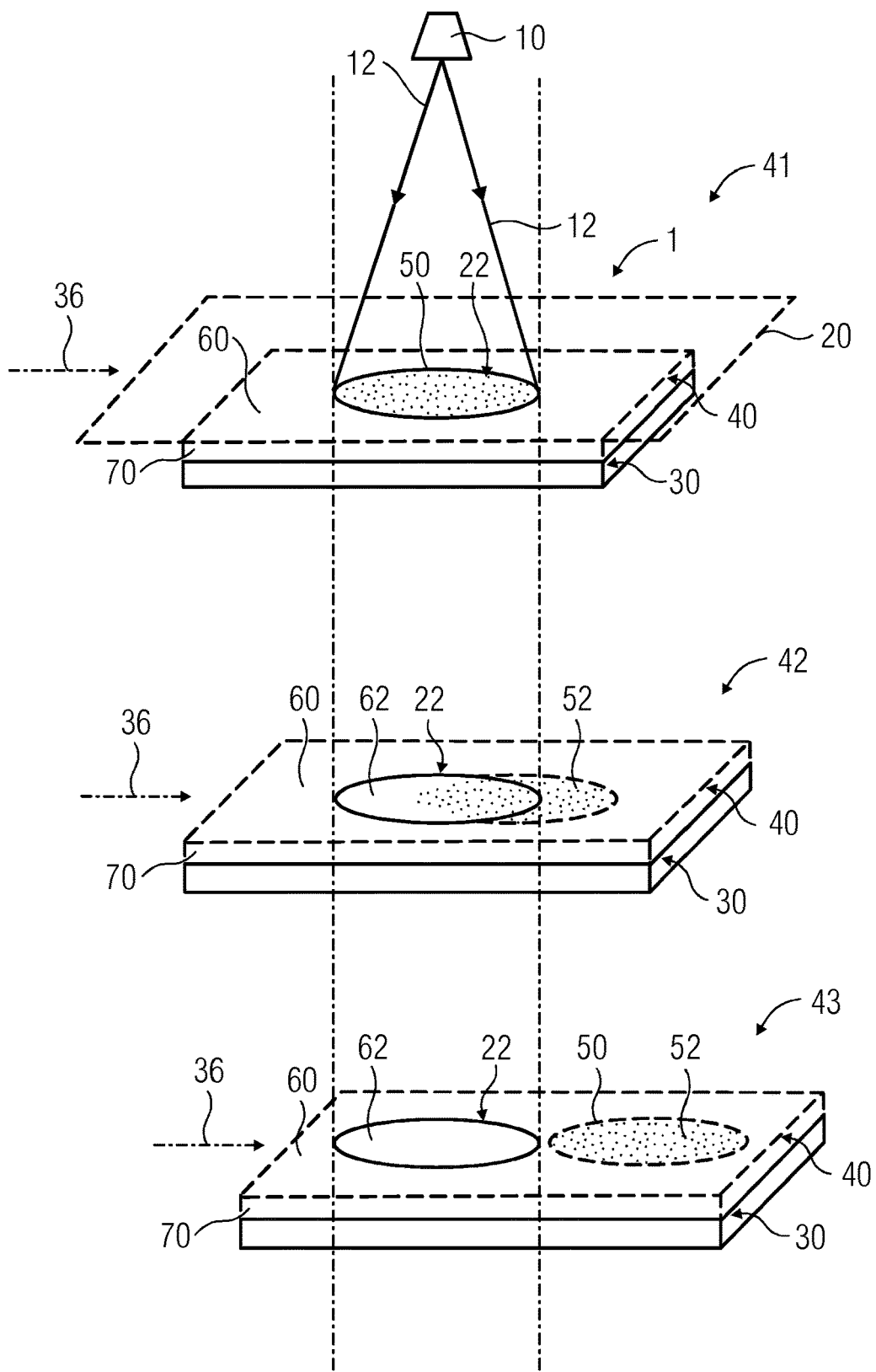
FIG. 2 is a schematic drawing of another exemplary embodiment of the laser sintering device depicting a translational motion of the sintering platform.

In FIG. 2, the sintering platform 30 supports the layer 70 of the feedstock and provides the sintering area 40. The first region 50 and the second region 60 are substantially coplanar. A first position in the translational motion of the sintering platform 30 is depicted herein by reference numeral 41. In the first position 41, the first region 50 of the sintering area 40 is located in the action area 22. The sintering operation is performed on the region 50. Subsequently, the translational motion is effected on the sintering platform 30 along the translational axis 36 and thus, the sintering platform 30 moves to a second position in the translational motion of the sintering platform 30, the second position depicted herein by reference numeral 42. In the second position 42, the part 52 of the first region 50 of the sintering area 40 moves out of the action area 22 and the part 62 of the second region 60 moves into the action area 22. Another sintering operation is performed on the part 62 and a part of the first region 50 that still remains located in the action area 22.

Subsequently, the translational motion is again effected on the sintering platform 30 along the translational axis 36 which then moves to a third position in translational motion of the sintering platform 30, the third position depicted herein by reference numeral 43. In the third position 43, the first region 50 of the sintering area 40 moves completely out of the action area 22 and the action area 22 is completely covered by the part 62 of the second region 60. Another sintering operation is performed on the region 62 which now occupies the entire action area 22.

In another exemplary embodiment of the device 1, the translational axis 36 may change its direction during the translational motion of the sintering platform 30.

Referring back to FIG. 1, in another exemplary embodiment of the device 1, the movement of the sintering platform 30 may be performed by a rotary motion of the sintering platform 30 about a vertical axis 34 substantially perpendicular to the plane 20. The rotary motion of the sintering platform 30 about the vertical axis 34 is effected by a rotation module 80 included in the device 1. Although the vertical axis 34 is depicted by an arrow mark 34, it may be noted that the vertical axis 34 may be in any direction substantially perpendicular to the plane 20 and is not limited by the arrow mark 34. The sintering platform 30 may rotate about the vertical axis 34 in a clockwise or a counterclockwise direction. An exemplary embodiment of the device 1 depicting the rotary motion of the sintering platform 30 about the vertical axis 34 is further explained in FIG. 3.

Figure 3:
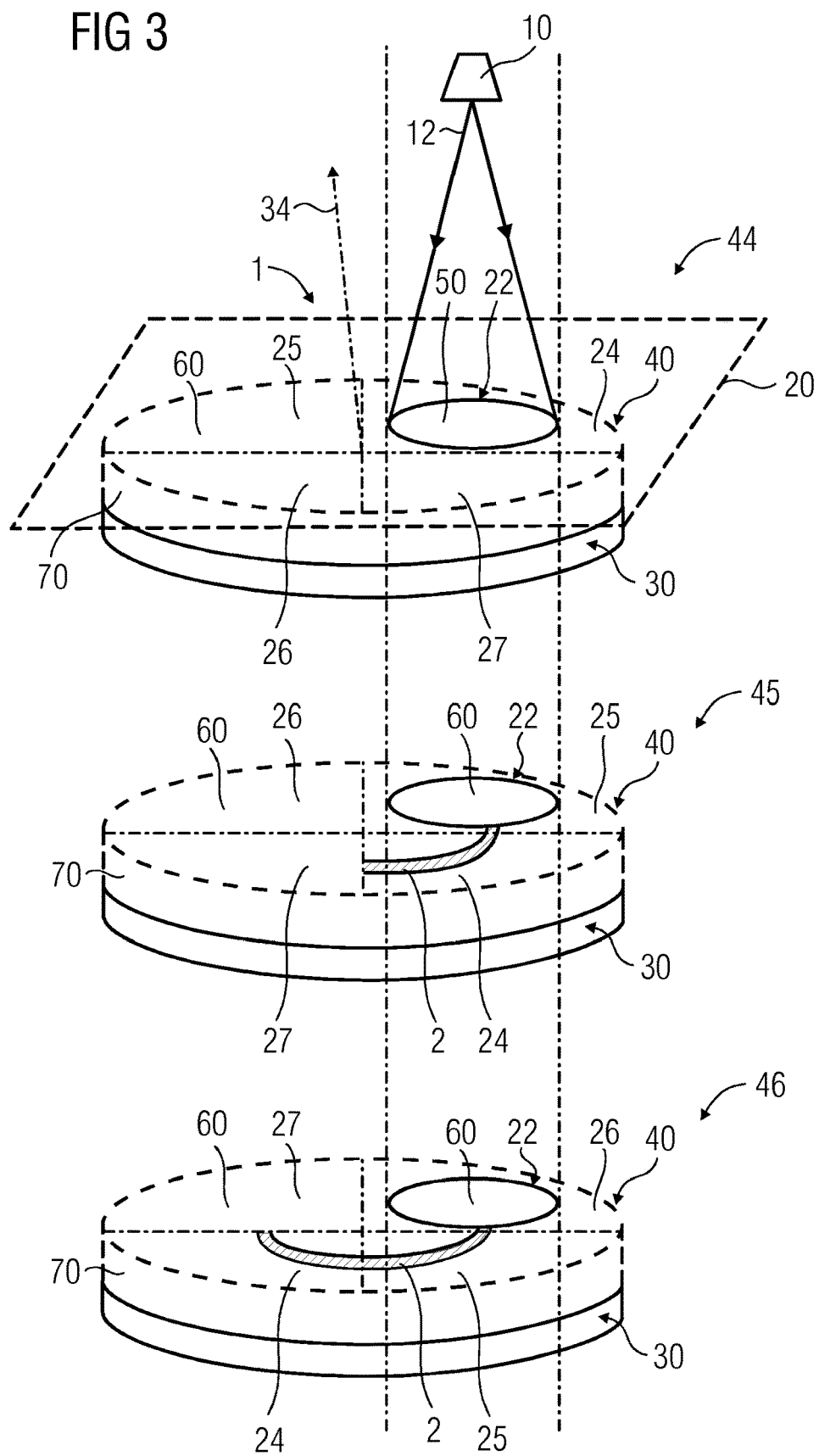
FIG. 3 is a schematic drawing of another exemplary embodiment of the laser sintering device depicting a rotary motion of the sintering platform about a vertical axis.

In FIG. 3, the sintering platform 30 supports the layer 70 of the feedstock and provides the sintering area 40. The first region 50 and the second region 60 are substantially coplanar. A first position in the rotary motion of the sintering platform 30 about the vertical axis 34 is depicted herein by reference numeral 44. The sintering platform 30 may include a substantially circular surface divided into a first quadrant 24, a second quadrant 25, a third quadrant 26 and a fourth quadrant 27. The circular surface of the sintering platform 30 may have any diameter, for example a diameter of 500 millimeter. The vertical axis 34 passes through the sintering platform 30 such that the quadrants 24, 25, 26, 27 are symmetrically arranged about the vertical axis 34. In the first position 44, the first quadrant 24 contains the region 50 of the sintering area 40 and is located in the action area 22. The second quadrant 25, the third quadrant 26 and the fourth quadrant 27 together form the second region 60. The sintering operation is performed on the region 50.

Subsequently, the sintering platform 30 is rotated about the vertical axis 34 and thus, the sintering platform 30 moves to a second position 45 in the rotary motion of the sintering platform 30 about the vertical axis 34. In the second position 45, the first quadrant 24 has moved out of the action area 22 and the second quadrant 25 has moved into the action area 22. Additionally, supported on the first quadrant 24, a sintered part 2 of the item to be manufactured also moves out of the action area 22. Another sintering operation is performed on the feedstock present in the second quadrant 25 and contained in the action area 22.

Subsequently, the sintering platform 30 is rotated about the vertical axis 34 and thus, the sintering platform 30 moves to a third position 46 in the rotary motion of the sintering platform 30 about the vertical axis 34. In the third position 46, the second quadrant 25 has moved out of the action area 22 and the third quadrant 26 has moved into the action area 22. Additionally, supported on the first quadrant 24 and the second quadrant 25, the sintered part 2 of the item to be manufactured also moves out of the action area 22. Another sintering operation is performed on the feedstock present in the third quadrant 26 and contained in the action area 22.

Referring back to FIG. 1, in another exemplary embodiment of the device 1, the movement of the sintering platform 30 may be performed by a rotary motion of the sintering platform 30 about a horizontal axis 32 substantially parallel to the plane 20. The rotary motion of the sintering platform 30 about the horizontal axis 32 is effected by the rotation module 80 included in the device 1. Although the horizontal axis 32 is depicted by an arrow mark 32, it may be noted at the horizontal axis 32 may be in any direction substantially parallel to the plane 20 and is not limited by the arrow mark 32. The sintering platform 30 may rotate about the horizontal axis 32 in a clockwise or a counterclockwise direction. An exemplary embodiment of the device 1 depicting the rotary motion of the sintering platform 30 about the horizontal axis 32 is further explained in FIG. 4.

It may be noted that, the rotation module 80 may comprise a first sub-module (not shown) adapted to move the sintering platform 30 in the rotary motion about the horizontal axis 32 substantially parallel to the plane 20 and a second sub-module (not shown) adapted to move the sintering platform 30 in the rotary motion about the vertical axis 34 substantially perpendicular to the plane 20.

Figure 4:
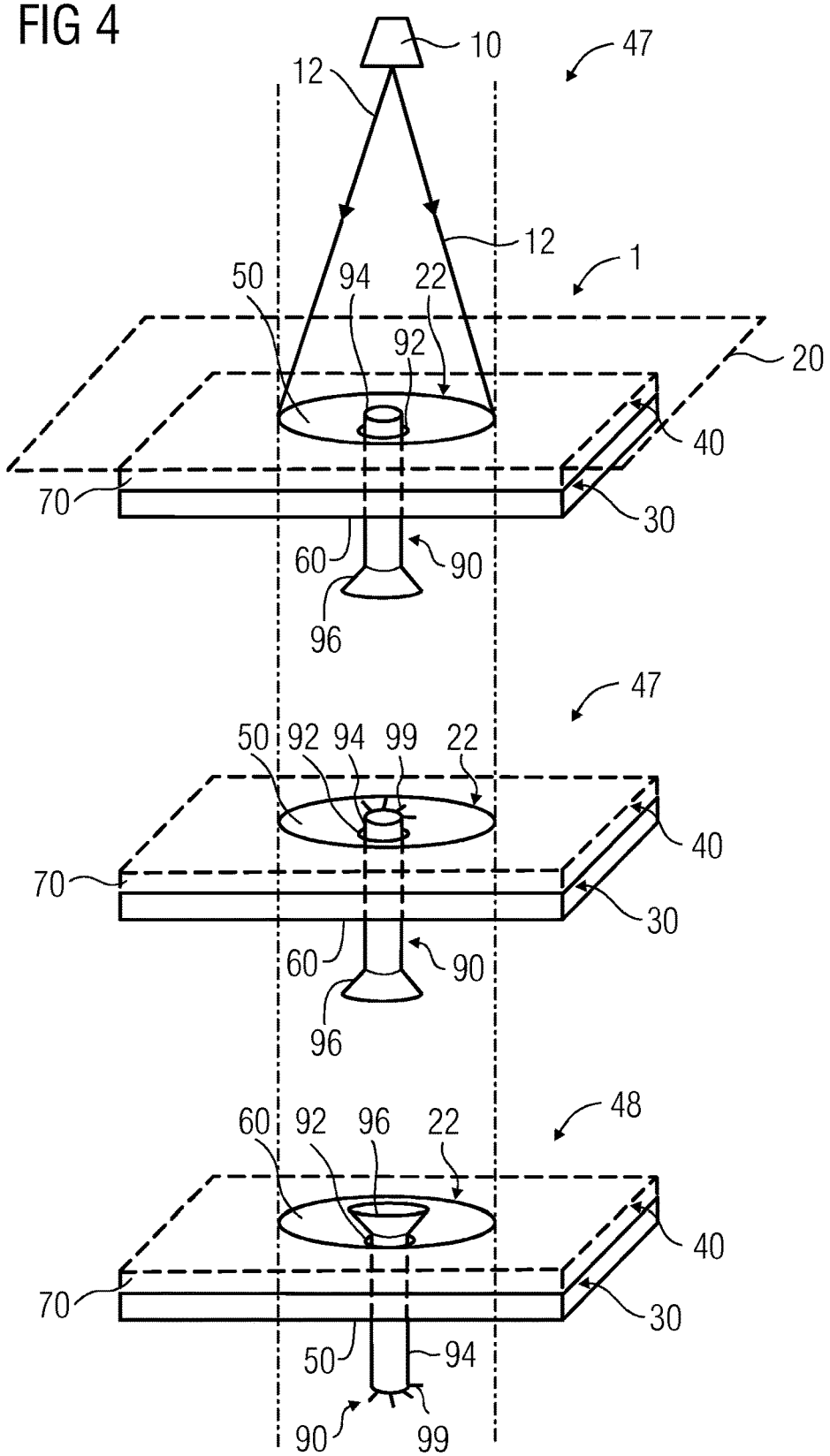
FIG. 4 is a schematic drawing of another exemplary embodiment of the laser sintering device depicting a rotary motion of the sintering platform about a horizontal axis.

In FIG. 4, the sintering platform 30 supports the layer 70 of the feedstock and provides the sintering area 40. The first region 50 and the second region 60 are non-coplanar and substantially parallel to each other. A first position in the rotary motion of the sintering platform 30 about the horizontal axis 32 is depicted herein by reference numeral 47.

The sintering platform 30 includes a means 92 for attachment of a workpiece 90 with the sintering platform 30. The means 92 may be, but not limited to, a hole or a cutout in the sintering platform 30 such that the workpiece 90 may fit snugly in the hole or the cutout. Optionally, as depicted in the exemplary embodiment represented in FIG. 4, the workpiece 90 is attached to the sintering platform 30 such that at least a first part 94 of the workpiece 90 extends into the first region 50 and at least a second part 96 of the workpiece 90 extends into the second region 60. In the first position 47, the sintering operation is performed on the region 50 and thus, on the first part 94 of the workpiece 90. As a result of the sintering operation performed on the first part 94 of the workpiece 90, a sintered portion 99 on the workpiece 90 is created.

Subsequently, the sintering platform 30 is rotated about the horizontal axis 32 and thus, the sintering platform 30 moves to a second position 48 in the rotary motion of the sintering platform 30 about the horizontal axis 32. In the second position 48, the sintering platform 30 is oriented upside-down as compared to the first position 47. The part 94 of the workpiece 90 along with the sintered portion 99 at the region 50 moves out of the action area 22 and the part 96 of the workpiece 90 at the region 60 moves into the action area 22. Another sintering operation is performed on the feedstock present in the region 60 and thus, on the second part 96 of the workpiece 90. As a result of the sintering operation performed on the second part 96 of the workpiece 90, additional sintered portion (not shown) on the workpiece 90 is created.

Referring back to FIG. 1, the laser sintering device 1 includes a retraction module 84 to effect a retraction motion of the sintering platform 30 along a retraction axis 38 substantially perpendicular to the plane 20. Thus, as a result of the retraction motion, the sintering platform moves downwards with respect to the plane 20 such that one or more layers of feedstock of desired thickness may be applied on the sintering platform 30.

As depicted in FIG. 1, in another embodiment, the laser sintering device 1 includes a controller 86 to control the rotary motion of the sintering platform 30 about the horizontal axis 32 and/or the rotary motion of the sintering platform 30 about the vertical axis 34 and/or the translational motion of the sintering platform 30 along the translational axis 36 and/or the retraction motion of the sintering platform 30 along the retraction axis 38. The controller 86 may be, but not limited to, a processor.

In an exemplary embodiment the controller 86 may synchronize any one or more movements of the sintering platform 30 out of the rotary motion of the sintering platform 30 about the horizontal axis 32 or the rotary motion of the sintering platform 30 about the vertical axis 34 or the translational motion of the sintering platform 30 along the translational axis 36 and the retraction motion of the sintering platform 30 along the retraction axis 38. For example, for every 360 degree rotation of the sintering platform 30 about the vertical axis 34, the sintering platform 30 may be retracted or moved downward by a distance equal to a desired thickness of the layer 70 of the feedstock, for example 20 to 60 micrometer.

Figure 5:
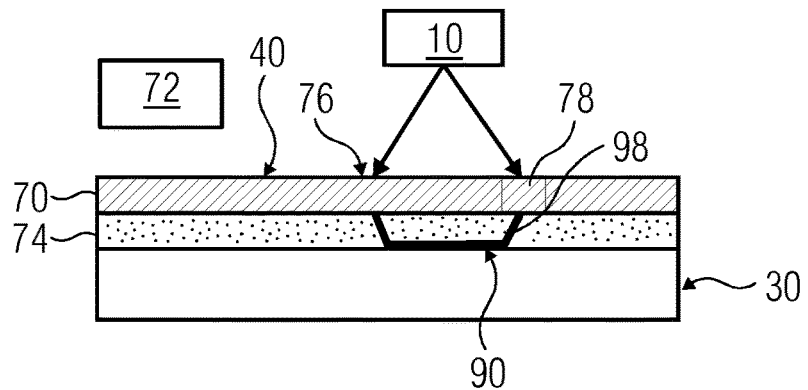
FIG. 5 is a schematic drawing of another exemplary embodiment of the laser sintering device depicting a feedstock supply module.

FIG. 5 is a schematic drawing of another exemplary embodiment of the laser sintering device 1 depicting a feedstock supply module 72. The feedstock supply module 72 applies the layer 70 of the feedstock onto the sintering platform 30 or onto a pre-existing layer 74 of the feedstock. The workpiece 90 is positioned within the layers 70, 72 of the feedstock. A part 98 of the workpiece 90 is covered by a covering layer 76 of the feedstock prior to carrying out the sintering operation. The sintering surface 40 is formed of at least a part 78 of the covering layer 76.

Figure 6:
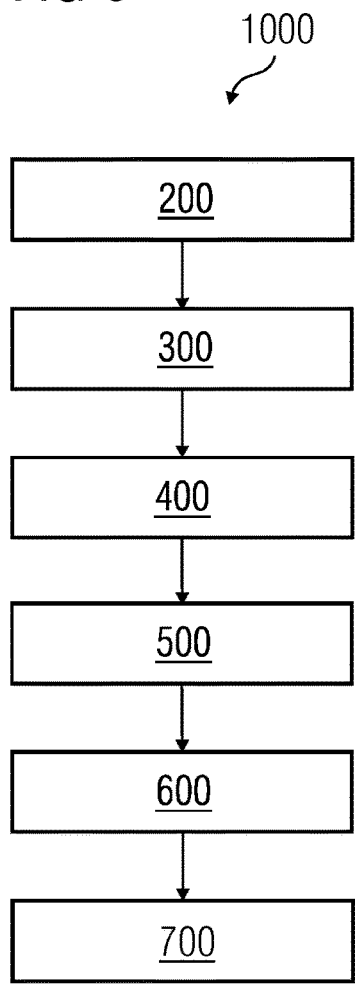
FIG. 6 is a flowchart representing a laser sintering method, according to the invention.

Now referring to FIG. 6, a flowchart representing a laser sintering method 1000 is represented. The laser sintering method 1000 uses a laser sintering device comprising a laser source adapted to project a laser beam on a plane, and further adapted to change a direction of the laser beam to define an action area in the plane. In a step 200, the action area is defined in the plane by changing the direction of the laser beam. In a step 300, a layer of feedstock is applied on a sintering platform and a sintering area is provided by supporting a layer of the feedstock on at least a part of the sintering platform. The sintering platform is arranged such that at least a first region of the sintering area is located within the action area and at least a second region of the sintering area is located outside the action area. In a step 400, the laser beam is projected on the action area when the first region is located within the action area and a first sintering operation is performed. Subsequently, in a step 500, the sintering platform is moved such that at least a part of the second region replaces at least a part of the first region within the action area. Finally, in a step 700, the laser beam is projected on the action area when the part of the second region is located within the action area and a second sintering operation is performed. It may be noted that the first and second sintering operations may be intermittently performed wherein after completion of the first sintering operation in the step 500, the sintering platform is moved in the step 600 and then subsequently the second sintering operation is initiated in the step 700. Alternatively, the steps 500, 600 and 700 may be performed in a continuous manner without any intervals between the step 500 and step 700.

Figure 7:
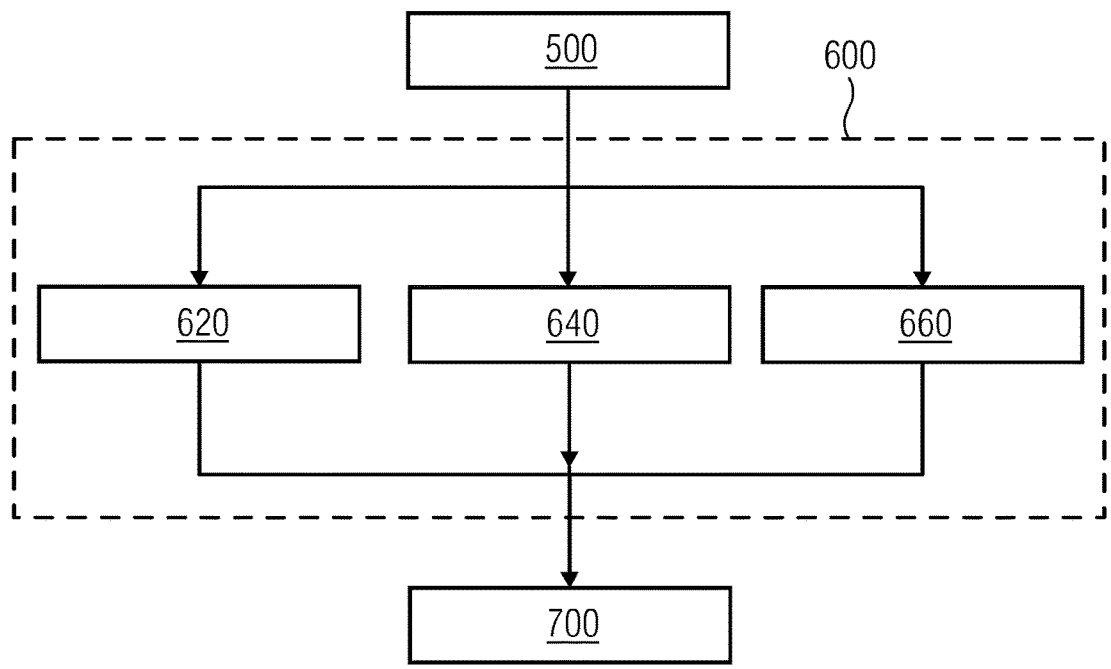
FIG. 7 is an exemplary embodiment of the laser sintering method including rotary motions and translational motion.

In one embodiment of the laser sintering method 1000, as represented by a flowchart in FIG. 7, moving the sintering platform in step 600 includes a step 620 of rotating the sintering platform about a horizontal axis substantially parallel to the plane and/or a step 640 of rotating the sintering platform about a vertical axis substantially perpendicular to the plane and/or a step 660 of effecting a translational motion of the sintering platform along a translational axis substantially parallel to the plane.

Figure 8:
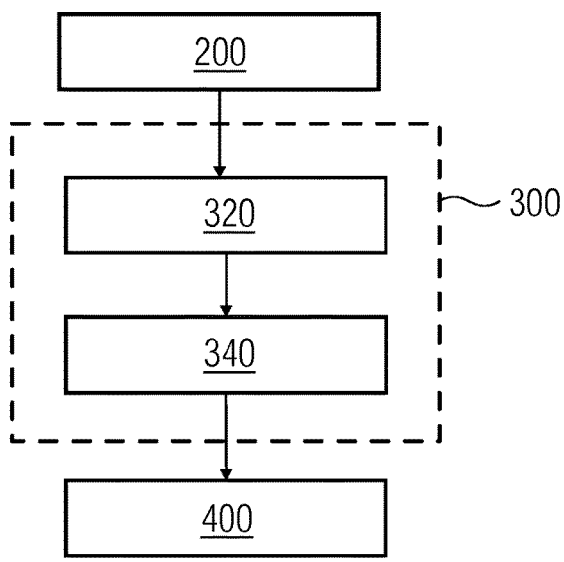
FIG. 8 is another exemplary embodiment of the laser sintering method with a workpiece.

In another embodiment of the laser sintering method 1000, as represented by a flowchart in FIG. 8, applying the feedstock on the sintering platform in the step 300 includes a step 320 of attaching a workpiece with the sintering platform, and a step 340 of providing a covering layer of feedstock around at least a part of the workpiece such that the sintering area is provided by at least a part of the covering layer.

While this invention has been described in detail with reference to certain embodiments, it should be appreciated that the present technique is not limited to those precise embodiments. Rather, in view of the present disclosure which describes the current best mode for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A laser sintering device comprising:
   a laser source adapted to project a laser beam on a plane, and further adapted to change a direction of said laser beam such as to define an action area on said plane, and
   a sintering platform adapted to provide a sintering area by supporting a layer of feedstock on at least a part of said sintering platform,
   a platform rotator adapted to move said sintering platform in a rotary motion about a horizontal axis substantially parallel to said plane,
   wherein said sintering platform is arranged such that at least a first region of said sintering area is located within said action area and at least a second region of said sintering area is located outside said action area, and
   wherein said sintering platform is movable such that at least a part of said second region replaces at least a part of said first region within said action area, wherein in a second position, said sintering platform is oriented upside-down as compared to a first position of said sintering platform, wherein said sintering platform comprises a means for attachment of a workpiece with said sintering platform, wherein the means for attachment comprises a through hole on the sintering platform.

2. The laser sintering device according to claim 1, wherein said platform rotator is adapted to move said sintering platform in a rotary motion about a vertical axis substantially perpendicular to said plane.

3. The laser sintering device according to claim 1, further comprising
   a platform translator adapted to effect a translational motion of said sintering platform along a translational axis substantially parallel to said plane.

4. The laser sintering device according to claim 1, further comprising
   a platform retractor adapted to effect a retraction motion of said sintering platform along a retraction axis substantially perpendicular to said plane.

5. The laser sintering device according to claim 1, further comprising
   a controller adapted to control at least one of: said rotary motion about said horizontal axis; rotary motion about a vertical axis; translational motion along a translational axis; and retraction motion along a retraction axis.

6. The laser sintering device according to claim 1, wherein said workpiece is attached such that at least a first part of said workpiece extends into said first region of said sintering area and at least a second part of said workpiece extends into said second region of said sintering area.

7. The laser sintering device according to claim 1, further comprising
a feedstock supply for applying powder feedstock onto said sintering platform or onto a pre-existing layer of feedstock.

8. The laser sintering device according to claim 1, wherein said first region and said second region are non-coplanar and substantially parallel to each other.

9. A laser sintering method using a laser sintering device comprising a laser source adapted to project a laser beam on a plane, and further adapted to change a direction of said laser beam such as to define an action area in said plane, the method comprising:
defining said action area in said plane by changing said direction of said laser beam,
applying a feedstock on a sintering platform adapted to provide a sintering area by supporting a layer of said feedstock on at least a part of said sintering platform,
arranging said sintering platform such that at least a first region of said sintering area is located within said action area and at least a second region of said sintering area is located outside said action area,
projecting said laser beam on said action area wherein said first region is located within said action area,
moving said sintering platform such that at least a part of said second region replaces at least a part of said first region within said action area, and
projecting said laser beam on said action area wherein said part of said second region is located within said action area,
wherein moving said sintering platform comprises rotating said sintering platform about a horizontal axis substantially parallel to said plane, such that in a second position, said sintering platform is oriented upside-down as compared to a first position of said sintering platform.

10. The laser sintering method according to claim 9, wherein moving said sintering platform further comprises at least one of:
rotating said sintering platform about a vertical axis substantially perpendicular to said plane; and effecting a translational motion of said sintering platform along a translational axis substantially parallel to said plane.

11. The laser sintering method according to claim 9, wherein applying said feedstock on said sintering platform comprises:
attaching a workpiece with said sintering platform, and
providing a covering layer of feedstock around at least a part of said workpiece such that said sintering area is provided by at least a part of said covering layer.

* * * * *